United States Patent
Herman et al.

[11] 3,719,942
[45] March 6, 1973

[54] ADAPTIVE AUTOMATIC GAIN CONTROL FOR RADAR SYSTEMS

[75] Inventors: Elvin E. Herman, Pacific Palisades; Michael R. O'Sullivan, Palos Verdes Peninsula, both of Calif.

[73] Assignee: Hughes Aircraft Company, Culver City, Calif.

[22] Filed: Sept. 30, 1970

[21] Appl. No.: 76,847

[52] U.S. Cl. .................................................343/7 A
[51] Int. Cl. ...............................................G01s 9/02
[58] Field of Search............................343/7 A, 7.7

[56] References Cited

UNITED STATES PATENTS

| | | | |
|---|---|---|---|
| 3,267,468 | 8/1966 | Stull, Jr. | 343/7.7 |
| 3,564,547 | 2/1971 | Dent | 343/7 A X |
| 3,392,387 | 7/1968 | Kirkpatrick | 343/7.7 X |
| 3,290,676 | 12/1966 | Adams et al. | 343/7 A X |

Primary Examiner—Malcolm F. Hubler
Attorney—James K. Haskell and Walter J. Adam

[57] ABSTRACT

An adaptive automatic gain control (AGC) system (also referred to as an adaptive sensitivity time control) is disclosed for pulsed radar applications to reduce the input dynamic range requirements to a doppler signal processor by forming a "running average" of a video signal along a range sweep over a succession of range bins and forming a "running average" over corresponding range elements of a large number of successive sweeps, where an element comprises one or more range bins. The resulting "running average" which constitutes a control function with a high degree of sweep-to-sweep stability because of the large amount of averaging is fed forward or back to an IF or other amplifier for gain control thereof.

9 Claims, 7 Drawing Figures

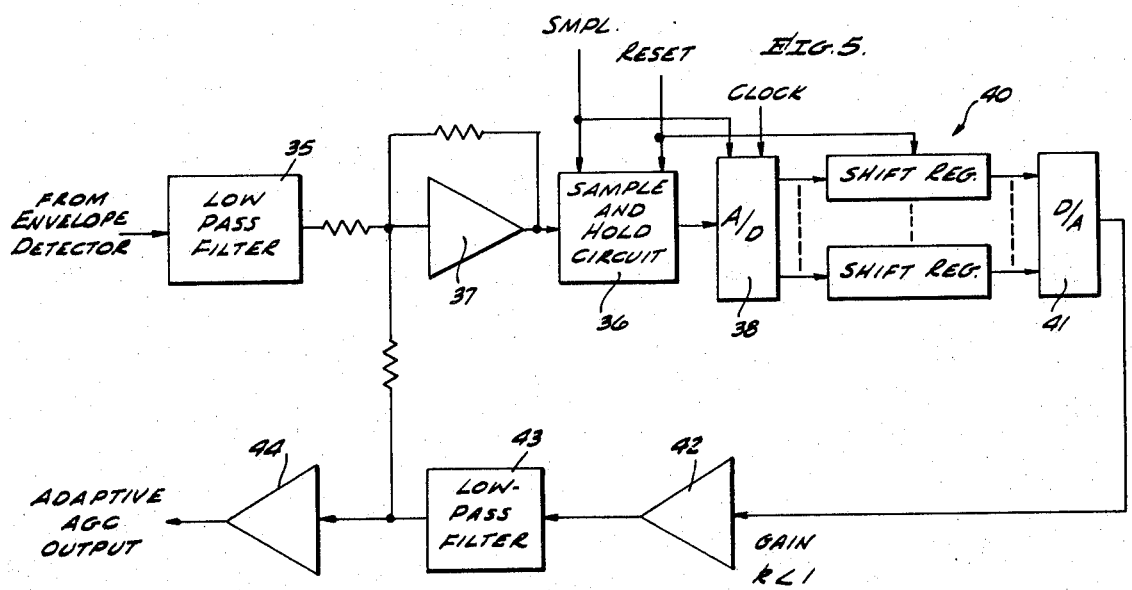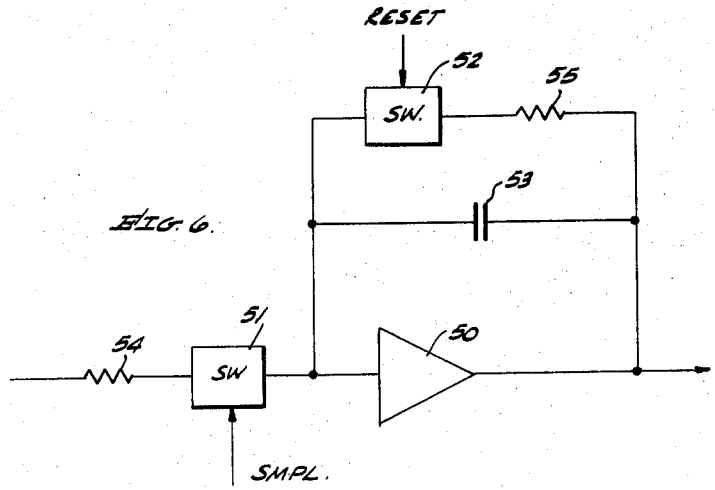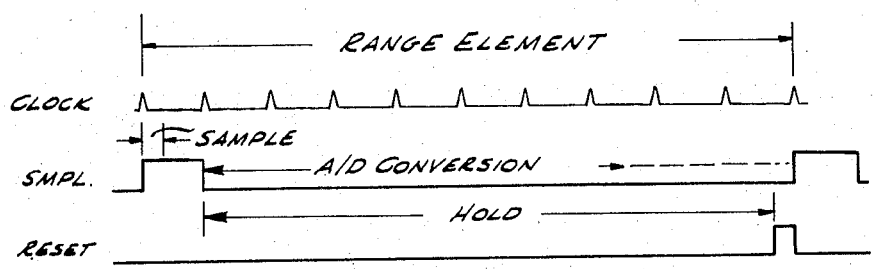

ADAPTIVE AUTOMATIC GAIN CONTROL FOR RADAR SYSTEMS

BACKGROUND OF THE INVENTION

This invention relates to pulsed radar systems which utilize doppler shift discrimination, and particularly to adaptive automatic-gain control for such radars.

In the past, doppler discrimination techniques have been employed in both coherent and non-coherent MTI radars and in coherent mapping radars. In these applications, the doppler discrimination permits the detection of signals of small energy (e.g., moving targets or the return from a map resolution cell) in the presence of the large interfering signal due to the composite ground return (i.e., "clutter"). While such techniques have been successful for large ratios of "clutter" to "signal" energy, the extent of their application has been limited by the simultaneous requirements for large linear dynamic range in the signal processor and a high degree of sweep-to-sweep stability of the receiver gain. Attempts to reduce the dynamic range of the received signal by IF limiters and fast acting AGC circuits have resulted in degradation of stability. Thus, a system capable of reducing the processor dynamic range requirement for doppler radars while maintaining a high degree of stability would be highly desirable and would extend the capabilities of the present systems.

SUMMARY OF THE INVENTION

Briefly, the present invention reduces the dynamic range requirements on a radar signal processor, or any other apparatus which receives the return signal in the radar system and has a dynamic range constriction, by utilizing an adaptive automatic-gain-control (AGC) signal generator in a feed back (or a feed forward) loop to automatically adjust the signal level as a function of not only an average amplitude of the signal over a predetermined integration period of a range sweep, as in the past; but also as a function of an average amplitude of corresponding integration periods from successive range sweeps over one or more on target times. The sweep-to-sweep averaging leads to a gain control function with improved sweep-to-sweep stability relative to that of a fast acting AGC.

Averaging in range may be accomplished by means of a low-pass filter, or RC circuit having a suitable time constant that functions as a lossy integrator. Averaging in azimuth (i.e., sweep-to-sweep) may be accomplished by summing each range element of a new sweep with the corresponding accumulated range elements of previous sweeps, each time multiplying the previous sum by a factor K, where K is less than 1, when adding the sum to a corresponding new element. The selected value of K determines the period of integration for averaging in azimuth. The two dimensional (range and azimuth) averaging operation thus functions as an adaptive AGC signal generator for the radar system.

It is therefore an object of this invention to provide a system for reducing the input dynamic range requirements of a doppler signal processor or other receiver stages in a pulsed radar system.

It is a further object to achieve a reduction of dynamic range requirement of a doppler signal processor by reducing the dynamic range of the received signal without substantially degrading the sweep-to-sweep stability of a pulsed radar system.

It is a further object of this invention to provide for a pulsed radar system an AGC signal, the amplitude of which varies from range element to range element as a function of an average of a number of corresponding range elements from successive range sweeps.

It is another object of this invention to provide a closed loop integration system for providing a "running average" of corresponding range elements from a large number of successive range sweeps in a pulsed radar system, such that this average is very stable from sweep-to-sweep over a radar on target time.

The novel features that are considered characteristic of this invention are set forth with particularity in the appended claims. The invention will best be understood from the following description when read in conjunction with the accompanying drawings.

DESCRIPTION OF THE DRAWINGS

FIG. 5 illustrates schematically a preferred implementation of an adaptive AGC system in accordance with the present invention;

FIG. 6 illustrates schematically a typical sample-and-hold circuit for the adaptive AGC system of FIG. 5; and FIG. 7 is a timing diagram for the adaptive AGC system of FIG. 5.

DESCRIPTION OF THE PREFERRED EMBODIMENTS

Figure 1:
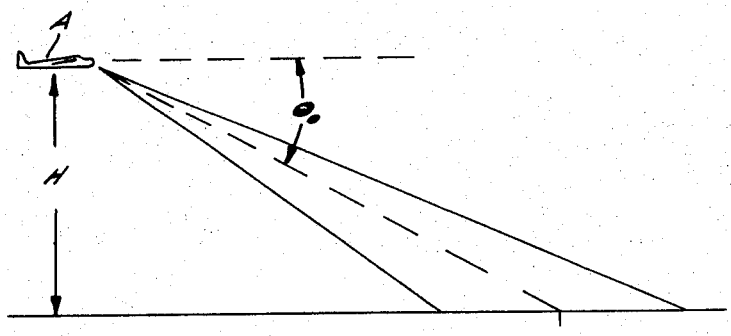
FIG. 1 is a diagram illustrating a low altitude search (or mapping) situation using a pulsed radar system.
Figure 2:
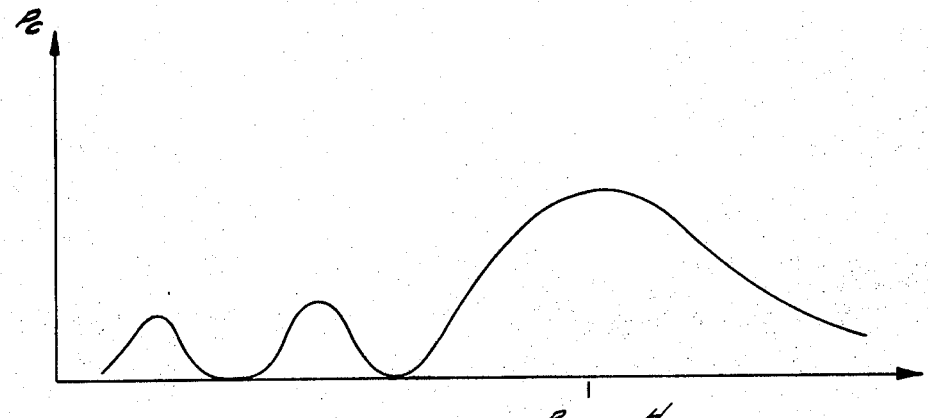
FIG. 2 is a graph of average ground return power versus range for the situation of FIG. 1.

FIG. 1 shows an aircraft A in a typical low altitude radar search (or mapping) situation with an antenna depression angle $\theta_o$. FIG. 2 presents a typical profile of average clutter (ground return power versus range). Variation of the average clutter power with range arises from the combined factors of antenna pattern, $R^{-4}$ variation, gross terrain variation, etc. The actual return power profile on any specific range sweep will contain a fine structure (high frequency power variations) which will cause it to depart from the average profile in a manner that depends upon the detail structure of the terrain. The preservation of the fine structure (without distortion) is essential to high quality doppler discrimination.

To accommodate the fine structure of the clutter return at a specified range without introducing non-linear distortion, and at the same time detect a target at that range with power less than that of the clutter, requires not only that the dynamic range of the processor be of the order of the clutter-to-target power ratio, but also that the system gain be adjusted so as to keep the sweep-to-sweep fluctuations of the clutter amplitude at that range within the linear region of the processor. But this applies to every range. Therefore, the processor must either have a dynamic range greater than the clutter-to-signal ratio by the amount of the average clutter power variation with range, which can be many tens of decibels, or the system gain must be controlled as a function of range. Limiters and fast acting AGC circuits have been used in the past to accomplish this gain control automatically, but both introduce nonlinear distortion of the clutter which interferes with target detection because control of gain for each range sweep has been independent of control for other range sweeps that precede and follow it.

What is desired is a gain adjustment that is stable for each range element over at least a beam width of scan in azimuth (i.e., an on target time). Otherwise, variations in ground clutter from sweep-to-sweep at a given range may cause the automatic gain control system to introduce modulation on the clutter. However, the AGC system should not be so stable as to preclude the adjustment required in system gain for changes in those factors that have an effect on the average clutter power profile of FIG. 2, such as altitude and antenna angle. Therefore, what is needed is an adaptive AGC system which will be stable over at least an on-target time and yet will automatically adjust its control function to changes in those factors which occur over periods greater than the time required to scan several beam widths.

Figure 3:
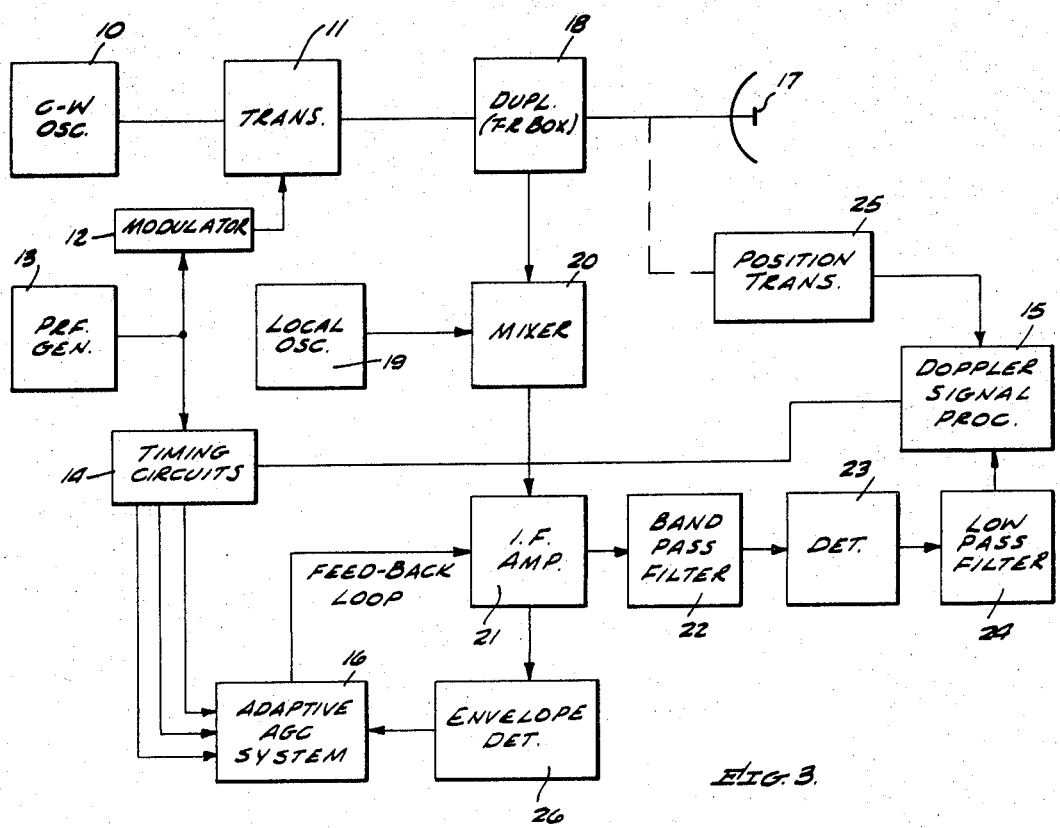
FIG. 3 is a schematic block diagram of a conventional coherent doppler radar system including an adaptive AGC system in accordance with the present invention.

Referring now to FIG. 3, a typical coherent pulse doppler radar system includes a continuous wave oscillator 10 connected to a transmitter 11 which is effectively gated on periodically by a modulator 12 in response to periodic pulses at a predetermined pulse repetition frequency (PRF) from a generator 13. Simultaneously, the PRF generator 13 sends pulses to timing circuits to synchronize a doppler signal processor 15 for target identification and display, and to synchronize an adaptive AGC system 16 in accordance with the present invention. Each echo-ranging sequence and cycle of the adaptive AGC system is thus initiated by a pulse from the PRF generator.

Successive pulses are transmitted through an antenna 17, via a duplexer or T-R box 18 at successive antenna positions as a motor (not shown) sweeps the antenna in azimuth. Returning echoes received by the same antenna are amplified and detected in a superheterodyne receiver comprising a local oscillator 19, a mixer 20, an IF amplifier 21, a band-pass filter 22, a detector 23, and a low-pass filter 24. The detector 23 may be a square-law, envelope, coherent or other type detector.

It is common practice to break up or range gate echo returns between PRF pulses into range bins. That is accomplish in the signal processor 15 in response to timing signals from the timing circuits 14. An antenna position transducer 25 provides a signal to the processor indicative of azimuth during each range sweep.

The IF amplifier 21 is also connected by an envelope detector 26 to the AGC system 16 where each range sweep is divided into a predetermined number of range elements, each range element including N range bins, where N is an integer selected to provide a running average of the detected signal amplitude over a predetermined period. That period, which may be referred to as the range smoothing period, is in turn selected to span a representative range of clutter, surrounding the target. For example, if a range sweep is 360 microseconds, the sweep may be divided into 100 elements, each 3.6 microseconds long. However, each range sweep may be synchronously divided into perhaps as many as ten times that number of range bins. The gain control signal fed back to the IF amplifier 21 during any range bin period by the adaptive AGC system is then a function of the average amplitude of the echo return (video) signal over an integration period approximately equal to the period of a range element.

In accordance with the present invention, the video signal of each range element from a given sweep is also averaged with video signals of corresponding range elements from successive range sweeps over several on target times, i.e., a number of range sweeps. For example, this averaging may occur over three antenna beamwidths. If the beamwidth were 3 degrees and the scan rate is 100 degrees per second, the integration period would be 90 milliseconds. With a PRF of 2 kHz, this would result in a running average over 180 sweeps. This running average is then used to adaptively control the gain of the IF amplifier 21 on a range-element by range-element basis to effectively reduce the dynamic range of the received signal and, consequently, the input dynamic range requirements on the signal processor 15.

Figure 4:
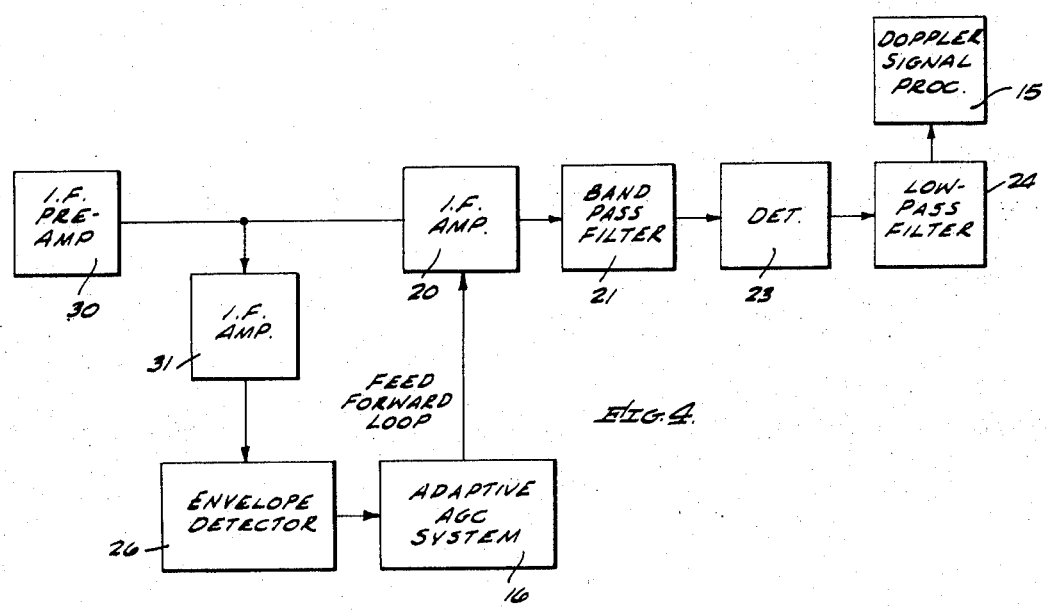
FIG. 4 is a schematic block diagram illustrating how the adaptive AGC system of FIG. 3 may be employed to provide a feed forward gain control signal instead of a feed back gain control signal.

Before describing a preferred embodiment of the adaptive AGC system 16, it should be noted that it may be employed to provide feed forward control, as shown in FIG. 4, as well as feed back control of gain. In a feed forward application the resulting gain control does not affect the amplitude of the input signal to the adaptive AGC system as it does in the feed back application of FIG. 3.

In the feed forward application, an IF preamplifier 30 and a second IF amplifier 31 are provided as a means for isolating the IF amplifier 20 from the adaptive AGC system 16. The application of the AGC system is otherwise the same as for the feed back application.

Referring now to FIG. 5, the adaptive AGC system of the present invention continually forms a running average of video return signals from a succession of range bins during each sweep and independently forms a running average of corresponding range elements from a large number of successive range sweeps over several beamwidths of antenna scan. The running average in the range dimension is formed using analog techniques, but digital techniques could be used. The running average in the other dimension is more easily formed using digital techniques because it requires storing the running average for a given range element until a corresponding range element from a following sweep is to be sampled. However, since the resulting running average is to be applied as an AGC signal in analog form, it is preferable to use analog techniques for forming the running average in both dimensions. The storage function may then still be implemented with digital techniques by employing an analog-to-digital converter at the storage input, and a digital-to-analog converter at the storage output.

A low-pass filter 35 is provided at the input of the adaptive AGC system for averaging the video return signals over a predetermined number of range bins of each range sweep. The number is established by the time constant of the filter, which functions as a lossy integrator and is selected to provide the desired range weighted averaging or smoothing as in previous AGC system.

The running weighted average in range is coupled to a sample-and-hold circuit 36 by a summing amplifier 37. Analog-to-digital conversion of the running range-element average is then accomplished on a range-element basis by resetting the sample-and-hold circuit after each conversion cycle of an A/D converter 38. The amplitude of the detected video envelope thus averaged, sampled and converted into digital form is then stored in a bank of shift registers 40. Successive range-element samples are converted and stored, each time shifting the previous values stored one place to the right. For example, if the A/D converter 38 provides 64 levels of quantization, each value in digital form is stored as a 6-bit number in parallel, one bit in each shift register. And if each range sweep is divided into 100 range elements, each shift register consists of 100 stages. After the initial range sweep, the bank of shift registers will be full with 100 range element samples.

At any given time after 180 range sweeps for the example given, the output of the bank of shift registers will consist of a 6-bit number for the running weighted average of corresponding range elements from the preceding 180 range sweeps. That number is converted from digital to analog form by a D/A converter 41, and added to the corresponding range element sample of the current sweep. The addition is accomplished through an amplifier 42 having a gain K of less than one coupled to the summing amplifier 37 by a low-pass filter 43. Thus the running weighted average achieved for each range element is independent of the average for any other range element, except as affected slightly by the smoothing action of the filter 43. By averaging each range element over a large number of sweeps, the average AGC signal derived for any one range element will not change very rapidly as the antenna scans. This AGC this derived reduces the input dynamic range requirements on the signal processor without adversely modulating the amplitude of the video signal to be processed (i.e., it preserves the inherent stability of the received signal and thus maintains its fine structure or detail intact).

To complete the formation of the running (time) weighted average signal as the desired AGC signal, the output of the filter 43 is amplified by a gain factor which includes a factor of $1-K$ through an amplifier 44. The reason for the gain factors of $K<1$ and $1-K$ in the amplifiers 42 and 44 may be better understood by noting the distinction between a running weighted average and a running linear average. The latter is simply the sum of a number of inputs $X_1$ to $X_n$, each divided by the total number N of inputs. As a new input $X_{n+1}$ is added, the oldest input $X_1$ is dropped from the average. In more general terms, a linear average at any given time for N samples is defined by the following expression when $W_n = 1$.

$$\text{Average} = \frac{\sum_{1}^{N} W_n X_n}{\sum_{1}^{N} W_n}$$

In a weighted average, the value of $W_n$ is allowed to vary in some fashion. For a running weighted average, it is desirable for the range element sample of the most recent sweep to have the greatest weight in the average. Accordingly, it is desirable for the coefficient $W_n$ of a given sample to decrease exponentially as a result of recirculation of that sample. That is accomplished by setting the gain factor K of the amplifier 42 equal to less than one, such as 0.9. Each time a given sample is recirculated as part of the weighted average, it is multiplied by that factor such that, at any given time, its value at the input of the summing amplifier 37 is the original amplitude multiplied by a coefficient $K^n$, where $n$ is the total number of recirculations. In other words, to form a running weighted average, the coefficient $W_n$ is reduced by a given amount each time the sample recirculates such that after a number of recirculations a given product $W_i X_i$ begins to approach zero and is no longer a significant contribution to the weighted average. The closer the factor K is to unity, the larger the number of recirculations required for the given product $W_i X_i$ to effectively drop out of the average, and therefore the more stable the average becomes since it includes more range sweeps. As noted hereinbefore, it is desirable to have a high degree of stability in the azimuth dimension, but the AGC signal should vary as a function of terrain although averaged over several beamwidths. If the azimuth integration time is chosen to be very short, for example, less than a beamwidth, then the resulting rapid variations in AGC as the scan angle changes may give rise to undesirable signal side bands. On the other hand, if the azimuth integration time is set too long, i.e., is set to average over a very large number of beamwidths with a value of K very near unity, such as 0.999, the AGC will not be responsive to variations in the average terrain over the azimuth scan region. A practical value of K for the previous example parameters chosen, i.e., for a 2kHz PRF, a 100°/sec. scan and a 3° beamwidth, might be 0.995. This would give an azimuth integration period of approximately three beamwidths.

To complete the formation of a running weighted average, each recirculated sample being transmitted as an AGC signal must be divided by $$\sum_{1}^{N} W_n.$$

That is accomplished in the present embodiment by setting the gain of the amplifier 44 to $1-K$, i.e., by multiplying by a factor equal to $1-K$.

Although the gain factor of K needs to be maintained in the amplifier 42 with precision, the gain factor $1-K$ need not be accurately maintained, and therefore need not be set with precision. If the factor $1-K$ should be inadvertently set to a value equal to or greater than one, the incorrect averaging system will still provide an AGC function. This can be readily appreciated when it is considered that, in practice, the AGC signal to be applied to adjust the radar system gain is multiplied by a factor $k$ which will depend upon system requirements. For example, if a very sensitive AGC system is required, the factor may be equal to more than unity, depending upon how gain adjustment is achieved, i.e., how the IF gain is controlled. Since the factors $k$ and $1-K$ may be combined in the amplifier 44, the factor 1−K need not be entered with any greater precision than the factor $k$. In other words, the gain of the amplifier 44 need not be set with any greater precision than AGC sensitivity considerations require.

During each sweep, new range elements are added to the weighted averages from the filter 35 through the summing amplifier 37, and after the system has been running for some time, for each new range element added to a weighted average, there is one effectively dropped, owing to the exponential decrease of the coefficient $K^n$ by which it is multiplied. Therefore, the weighted average formed at the output of the amplifier 44 may be referred to as a running weighted average.

Since an analog signal is necessary for AGC, the new range elements are added before conversion to digital form. Following this the summation is converted from analog to digital form for purposes of storage. Since detected video is being added to an analog signal reconstituted from range element data stored in digital form, it is desirable to low-pass filter both the detected video and the recirculated video to comparable bandwidths, e.g., 200 to 500 kHz in the filter 43.

An arrangement for a typical sample-and-hold circuit is illustrated in FIG. 6. It comprises an operational amplifier 50 connected to the summing amplifier 37 (FIG. 5) by a sampling switch 51 closed for one clock pulse (CP) period in response to a signal SMPL shown in the timing diagram of FIG. 7. While the switch 51 is closed, a switch 52 is open to allow a storage capacitor 53 to charge to the level of the input signal through the low resistance path of the switch 51 represented by a resistor 54. Once the switch 51 is again opened, the charge of the capacitor 53 is held until a reset signal closes the switch 52 at the end of a range-element period, as shown in FIG. 5. The capacitor 53 then quickly discharges through the low impedance of the switch represented by a resistor 55 to clear the circuit for the next range element sample.

Between the sample signal SMPL of a given range element and the next reset signal, clock pulses are applied to the A/D converter 38 for conversion of the sample amplitude into a binary number. The signal SMPL is also applied to the A/D converter to clear it of the binary umber of the previous sample since that binary number will by that time have been shifted into the registers in response to the reset signal which ends a range element period.

Not all of the time between a signal SMPL and a reset signal will be required to convert a sample to digital form for long range elements. For example, a successive approximation technique for conversion known to those skilled in the art requires only one clock period for each binary digit. In the example given, the range element is 3.6 microseconds and the number of binary digits is six. If the clock pulse period is then set to 0.1 microseconds, ample time is available to complete the conversion once the converter has been cleared by a sample signal SMPL before a reset signal shifts the registers.

Although signal averaging along a given range sweep has been referred to broadly as forming a running average, it may be readily appreciated that a low-pass filter, or RC circuit functioning as a lossy integrator, in essence provides a weighted running average since at any given time the energy stored in the filter or RC circuit will be made up of the sum of a number of video pulses, but the most recent pulse will be present in almost its full measure, while the progressively older pulses will be present in progressively smaller measure owing to the loss of energy from the integrating capacitor. The integrating period may readily set by simple setting the resistance of the discharge path for the stored energy, as by setting a potentiometer in parallel with the integrating capacitor. Therefore, although different techniques are employed for averaging in range than in azimuth, both may be referred to as techniques for forming weighted running averages over predetermined intervals of integration. For averaging in range, the intervals are periods of time, whereas for averaging in azimuth, the intervals are groups of range sweeps. However, since each successive range sweep is added, and the sum stored, the period over which that is done for a group of range sweeps may be considered as the effective period of integration.

The averaging in both range and azimuth could be accomplished using digital techniques, if that should be feasible, and either one, or both, could then be implemented as a linear average instead of a weighted average. Therefore, in its broadest aspects, the present invention is in no sense dependent upon any particular form of average. All that is required is that the average be continually updated to form a running average of N samples where, as each new sample is added, the oldest sample is dropped. In other words, the weighting factor $W_n$ of the general expression given hereinbefore for an average of a number of samples may be set equal to unity when there is provision for so updating the running average. Otherwise, the weighting factor must be set to less than one, but whereas the weighting factor (time constant) for the range averaging means (low-pass filter) is set for a relatively short integration period, the weighting factor for the azimuth averaging means is set independently for a relatively long integration period.

It should also be appreciated that although the invention has been described with reference to a coherent pulse doppler radar system, the invention may be employed to substantially equal advantage in non-coherent radar systems using doppler techniques for discriminating moving targets as well as in coherent mapping radar systems, and to some advantage in other radar systems that would employ radar. Therefore, it is not intended that the scope of the invention by determined by the disclosed exemplary embodiments, but rather should be determined by the breadth of the appended claims in which, as noted hereinbefore, a "-signal processor" may be doppler signal processor or other apparatus receiving the video return signal in the radar system having dynamic range constrictions.

What is claimed is:

1. In a radar system, apparatus for reducing the input dynamic range requirements to a signal processor, the combination comprising:

means for reducing video signal amplitude in said radar system in response to an automatic gain control signal which exhibits a high degree of sweep-to-sweep stability; and means for generating said automatic gain control signal as a function of a running average of video return signals in both range and azimuth.

2. In a pulsed radar system transmitting pulses during each of a plurality of range sweeps, apparatus for reducing the input dynamic range requirements to a signal processor, the combination comprising:
means for dividing the video signal of each range sweep of said pulsed radar system into range elements;
means for controlling the amplitude of said video signal in said radar system in response to an automatic gain control signal; and
means including a summing circuit, a plurality of parallel operation shift registers coupled to a summing circuit and a feedback path providing a gain factor less than one and coupled between said shift registers and said summing circuit, and providing said automatic gain control signal for each range element of a given sweep as a function of a running average of the video signal amplitude of a pre-determined number of corresponding range elements from successive range sweeps.

3. Apparatus as defined in claim 2 wherein the video signal is coupled to said generating means by a low-pass filter to provide a running weighted average in range over a predetermined integration period.

4. Apparatus as defined in claim 3 wherein said feedback path is selected with said gain factor to provide said predetermined number of corresponding range elements from successive range sweeps with an effective video signal averaging period in azimuth for a given range element sufficiently long to span a selected number of said range sweeps of said radar as said radar scans in azimuth.

5. In a pulsed radar system, apparatus for generating an adaptive automatic gain control signal comprising:
means for detecting the envelope of video signals from range sweeps;
means for forming a running weighted average of said envelope in range; and
means connected to said envelope averaging means for dividing each range sweep into a predetermined number of range elements, and for forming a weighted running average in azimuth of corresponding range element envelope averages to provide said adaptive automatic gain control signal.

6. In a pulsed radar system, apparatus for generating an adaptive automatic gain control signal comprising:
means for detecting the envelope of video signals from range sweeps;
means connected to said detecting means for forming a running weighted average of said envelope;
means connected to said averaging means for adding said running weighted average of said envelope to a signal at a separate terminal;
means for periodically sampling the sum signal at the output of said adding means, the period of sampling being selected to divide a given range sweep into a predetermined number of range elements;
means for storing the signal amplitude of each successive sample of said given range sweep;
means for recirculating the successive samples of said given range sweep during an immediately following range sweep to provide said signal at said separate terminal; and
means connected to said separate terminal for coupling therefrom said adaptive automatic gain control signal.

7. Apparatus as defined in claim 9 wherein said recirculating means has a gain of K less than one, whereby said adaptive automatic gain control signal is generated as a running weighted average of corresponding range sweep samples.

8. An automatic gain control system operable in a pulsed radar system providing radar return signals during each range element of a plurality of range sweeps comprising:
IF amplifier means responsive to said radar signals;
means for detecting the envelope of said radar signals;
integrating means coupled to said means for detecting for forming a running weighted average of said envelope;
summing means coupled to said integrating means;
sampling means coupled to said summing means for sampling the signal during each of a plurality of range elements;
shift register means coupled to said sampling means for storing the sampled signal during each range element of a sweep;
gain control means coupled to said shift register means having a gain constant K less than 1;
low pass filter means coupled between said gain control means and said summing means; and
means coupling said low pass filter means and said IF amplifier means to control the gain of said IF amplifier means.

9. The combination of claim 8 in which said means coupling said low pass filter means includes an amplifier having a gain constant 1−K.

* * * * *

PO-1050
(5/69)

UNITED STATES PATENT OFFICE
CERTIFICATE OF CORRECTION

Patent No. 3,719,942          Dated March 6, 1973

Inventor(s) ELVIN E. HERMAN and MICHAEL R. O'SULLIVAN

It is certified that error appears in the above-identified patent and that said Letters Patent are hereby corrected as shown below:

Column 1, after line 7, insert the following paragraph:

--The invention herein described was made in the course of or under a contract or subcontract thereunder with the Air Force.-- (As amended)

Column 9, line 12, "operation" should read --operating--. (As amended)

Column 10, line 18, "9" should read --6--. (As amended)

Signed and Sealed this eleventh Day of May 1976

[SEAL]

Attest:

RUTH C. MASON
Attesting Officer

C. MARSHALL DANN
Commissioner of Patents and Trademarks